United States Patent [19]
McDermott

[11] Patent Number: 6,024,471
[45] Date of Patent: Feb. 15, 2000

[54] ROTARY SWITCH LIGHTING DEVICE

[76] Inventor: Kevin McDermott, 196 Phillips Dr., Hampstead, Md. 21074

[21] Appl. No.: 08/947,546

[22] Filed: Oct. 11, 1997

[51] Int. Cl.[7] ........................................................ F21L 7/00
[52] U.S. Cl. ............................................ 362/394; 362/205
[58] Field of Search ............................ 315/200 A, 209 R; 362/394, 187, 205, 208

[56] References Cited

U.S. PATENT DOCUMENTS

| | | | |
|---|---|---|---|
| 4,048,631 | 9/1977 | Flores | 340/321 |
| 4,388,673 | 6/1983 | Maglica | 362/183 |
| 4,985,812 | 1/1991 | Uke | 362/158 |
| 5,367,446 | 11/1994 | Ellion | 362/184 |
| 5,418,433 | 5/1995 | Nilssen | 315/175 |

*Primary Examiner*—Laura K. Tso
*Attorney, Agent, or Firm*—Leonard Bloom

[57] ABSTRACT

The present invention describes a compact flashlight comprising a power control means which provides a plurality of lighting functions. The flashlight includes: a case, a battery, a bezel or lens, a light module and a power control means. The power control means comprises an activator and an electrical controller. The light module incorporates a lamp. The power control means provides an activator for a user of the flashlight to energize the lamp to any intensity within a range of intensities the lamp will remain energized at a selected intensity without further effort of the user. The power control means additionally permits the user to momentarily energize the lamp and for the lamp to extinguish upon release of the rotary switch by the user. The activator includes a lockout means to prevent inadvertent activation of the flashlight. The activator further includes a seal means to prevent entrance of water into the flashlight. The seal means optionally comprises a venting means to permit hydrogen gas emitted from the battery to escape from the flashlight before it creates unacceptable internal pressure and a related safety hazard.

41 Claims, 10 Drawing Sheets

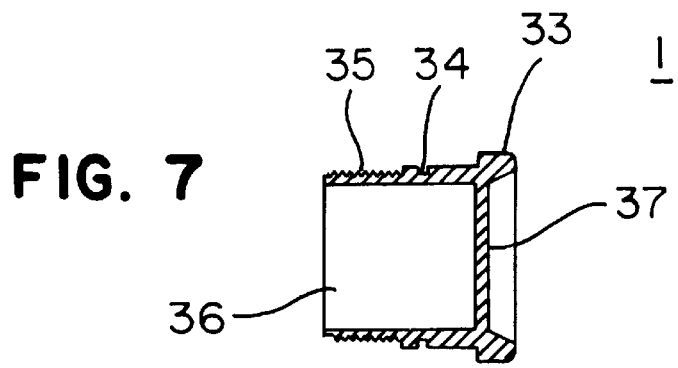
FIG. 7
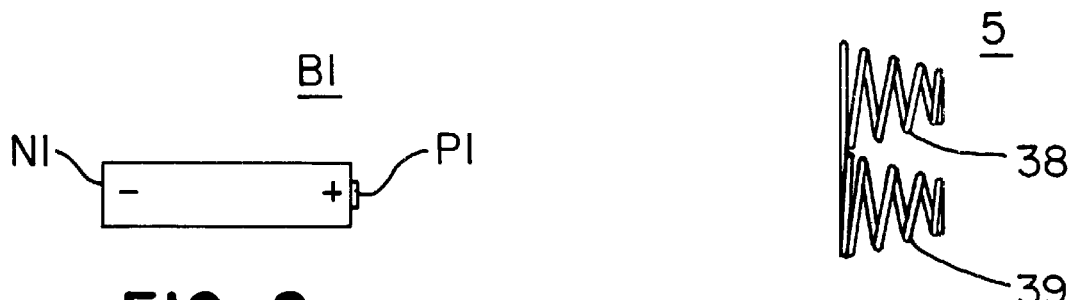
FIG. 8
FIG. 9
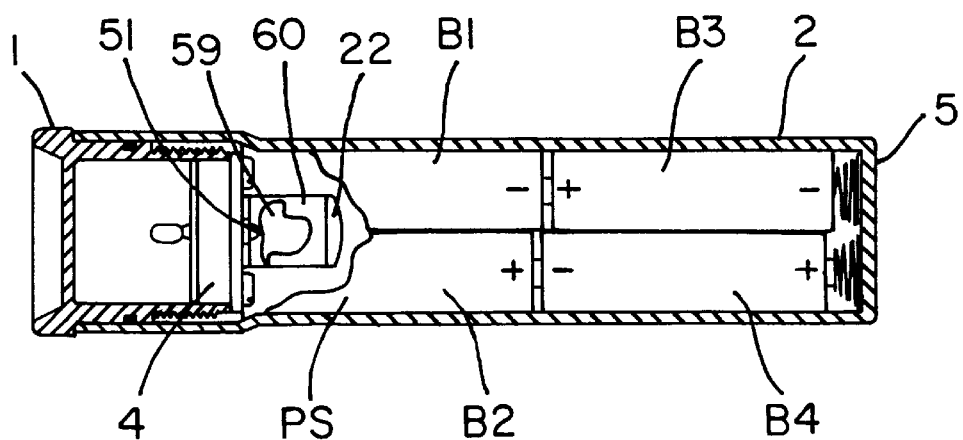
FIG. 10

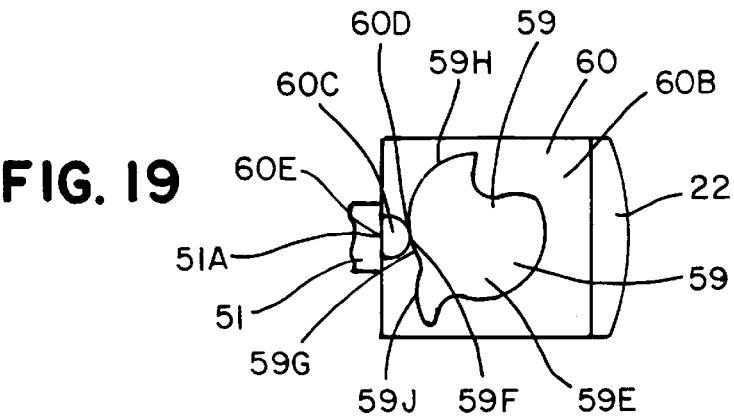
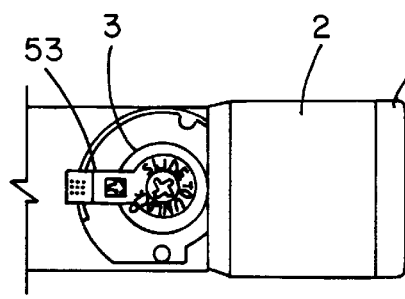
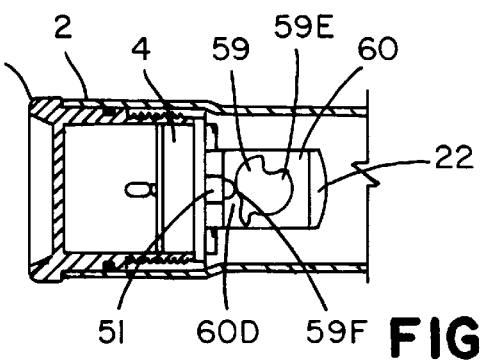
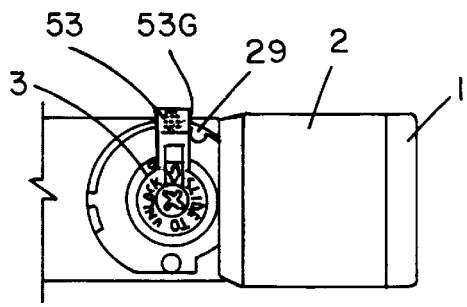
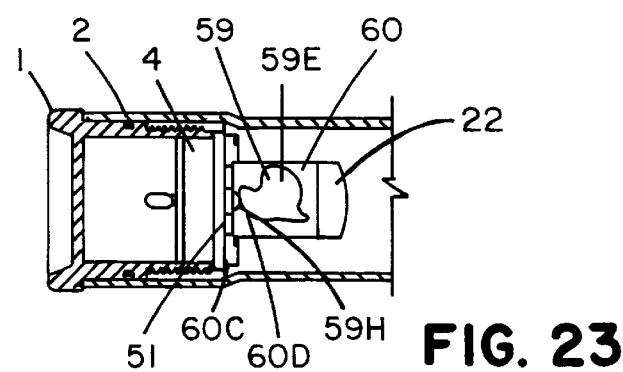
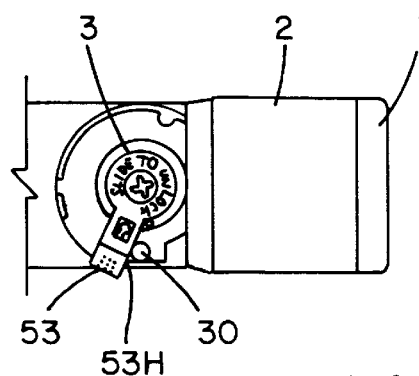
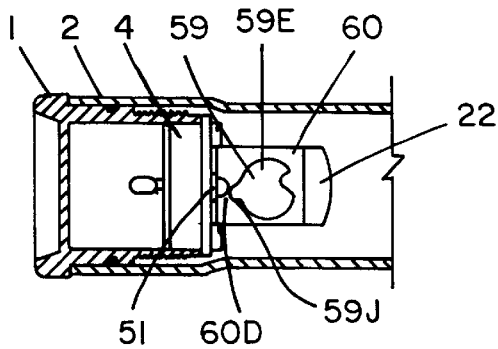

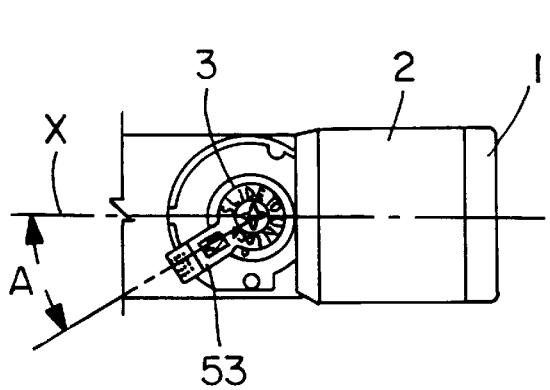
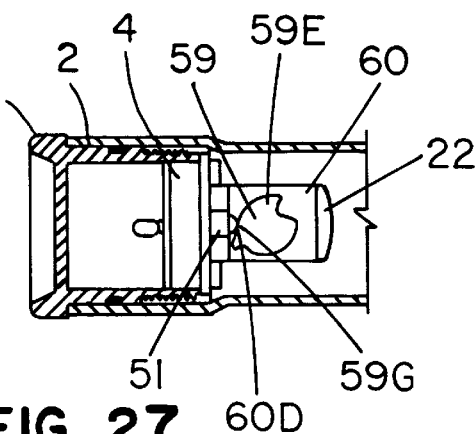
FIG. 26    FIG. 27
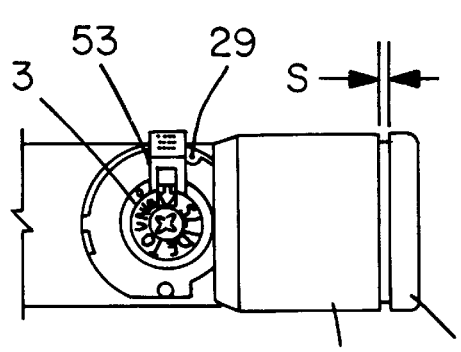
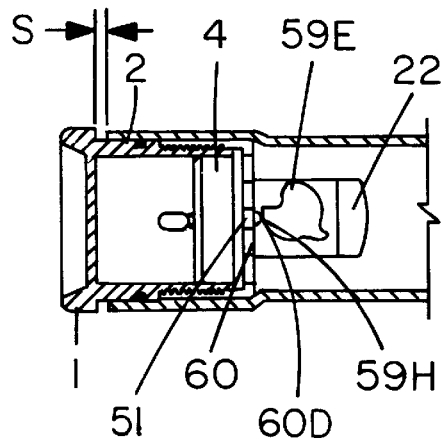
FIG. 28    FIG. 29
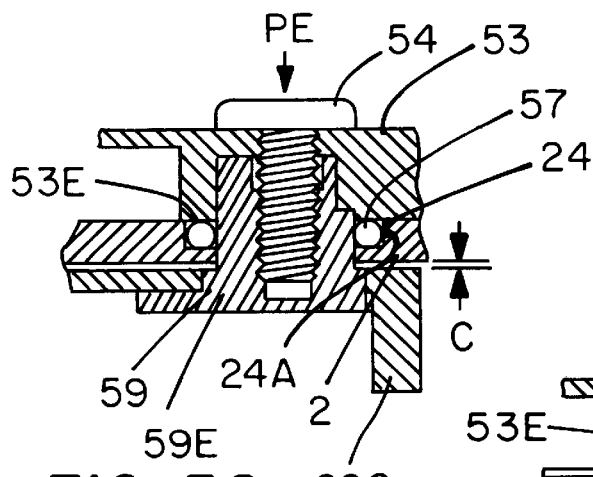
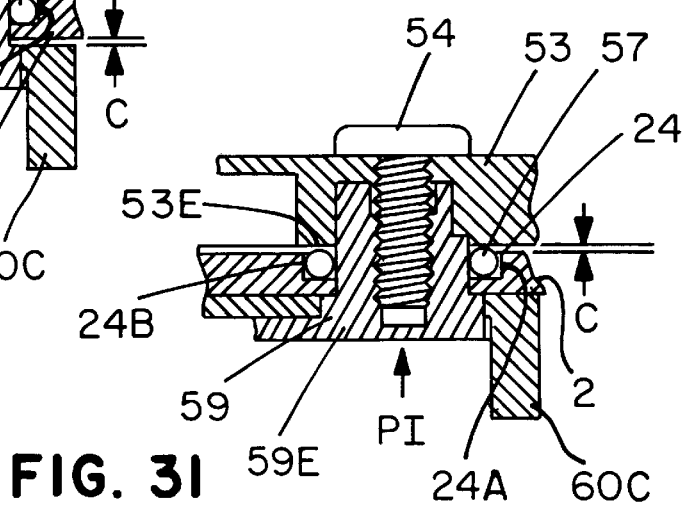
FIG. 30    FIG. 31

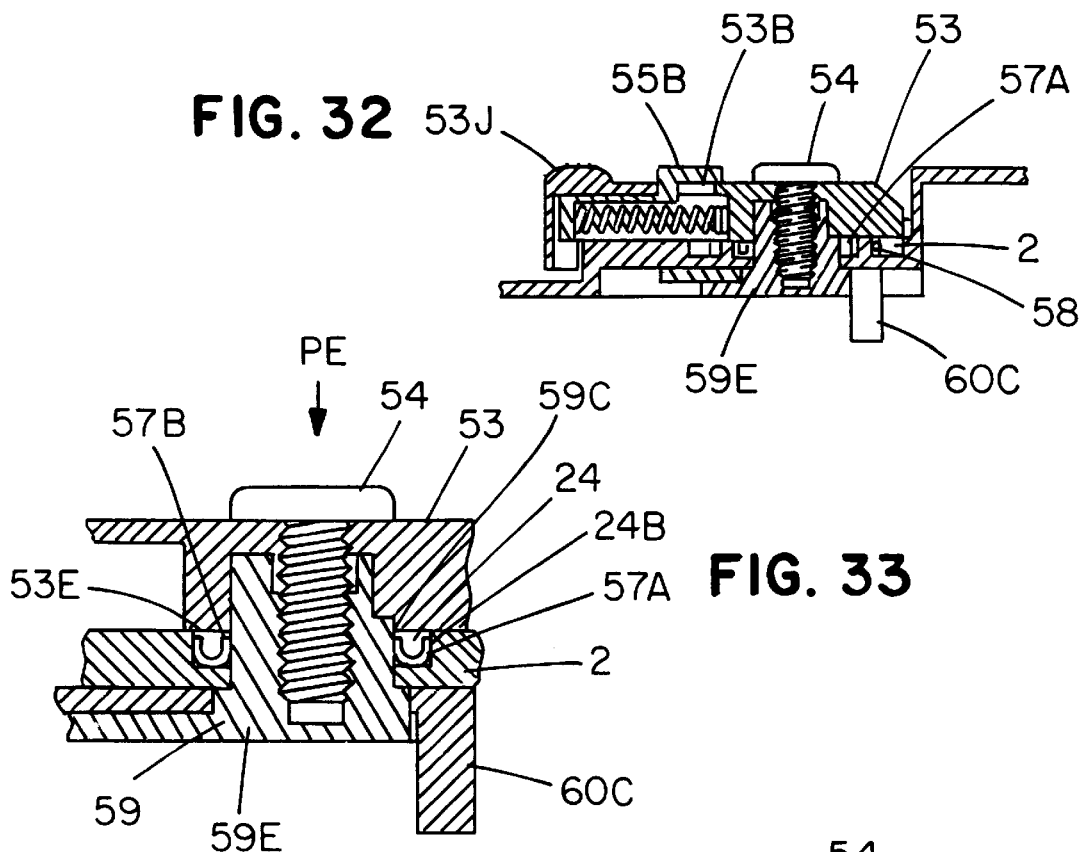
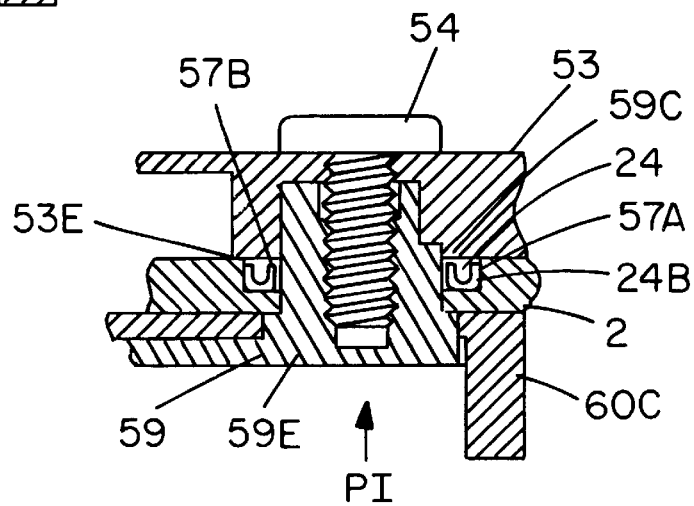
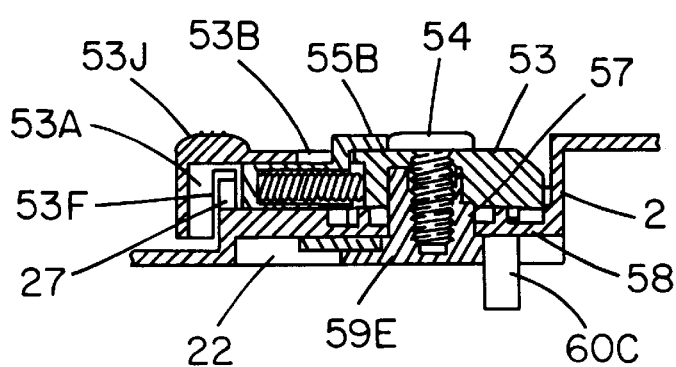

ROTARY SWITCH LIGHTING DEVICE

BACKGROUND OF INVENTION

The current invention provides a watertight flashlight with an adjustable intensity that finds application for a wide variety of uses such as scuba divers, auto mechanics and soldiers. Prior art provides a flashlight with a rotary switch offering "ON" and "OFF" positions. It does not provide a momentary "ON" position. The prior art switch is not easily accessible by the thumb of a user. It does not provide a variety of output light modes. The activator or switch is not easily visible to a user making it difficult for a user to know Its mode. The prior art design does not provide a means to continuously vary the intensity of the emitted light within a range of intensities. Prior art provides a watertight design with a seal at the switch but no disclosure is made regarding the ability of the prior art seal to release the internal hydrogen gas from its case to avoid a safety hazard. The switch on the prior art design does not include a means to lockout movement to prevent accidental switch activation. The contacts for the switch are part of the case. Therefore, worn or pitted contacts are not easily replaced if they become corroded. Prior art does not provide a means for the lens to assume control of the intensity of the lamp thereby permitting a user with large gloves to operate the light. Prior art does not provide a means to permit the position of the lens to limit the Intensity of the emitted light.

SUMMARY OF INVENTION

Embodiment of the current invention solve the many aforementioned problems of the prior art design. The current design discloses a flashlight with a power control means that is easily activated by the thumb of an operator. Additionally, the operator can easily use his thumb to achieve different intensity levels as well as a momentary "ON" mode. If the operator has gloves and cannot move the activator lever of the current design, he can still use the flashlight and control its intensity by rotating the lens. The flashlight is watertight and remains watertight even if the lens is partially unscrewed to adjust the intensity. An optional lockout is provided to assure that the activator lever does not accidentally energize the lamp during shipping and storage of the flashlight. A two direction seal is provided to permit hydrogen gas to escape the flashlight and avoid an explosion hazard while simultaneously sealing the flashlight against the entry of water.

The present invention describes a flashlight including; a case, a power supply, a light module comprising a lamp and a power control means. The flashlight is capable of a plurality of functions. The power control means usually comprises an activator and an electrical controller. The electrical controller is a switch, rheostat or potentiometer which is activated or controlled by the activator. The electrical controller normally includes a movable plunger which upon a deflection changes a parameter—usually its resistance—of the electrical controller to change the voltage to the lamp. The operator controls the power supplied to the lamp by manually moving the activator which in turn moves the plunger of the electrical controller and thereby adjusts the electrical controller which regulates the voltage applied to the lamp. The electrical controller employs a plunger which requires a linear movement to change its characteristics. However, other plungers requiring rotary or other movements could also be employed. The activator means is fastened to the case of the flashlight and the electrical controller fastened to the light module. This embodiment is advantageous in that the activator is not electrically connected to or physically fastened to the light module. This permits the light module to be easily removed from the flashlight for repair or when changing batteries. It also permits rapid maintenance as the electrical controller is contoured within the light module a component which is easily replaced.

The power control means turns the flashlight "ON" and "OFF". It also permits the flashlight to remain "ON" when unattended. It also permits the intensity to be varied within a range of intensities. It also provides a spring loaded momentary "ON" mode whereby the flashlight automatically extinguishes the lamp when its activating lever is released by the user. The momentary "ON" mode can also be employed by the user to pulse or flash the light or to send a coded signal with the output beam.

If the activator lever of the power control means is positioned at the "ON" position the control of the power to the lamp of the flashlight can be regulated by the position of the lens of the flashlight relative to the case. Thus an operator can regulate the intensity by a movement of the lens. This is desirable for those situations where a user has gloves and cannot easily manipulate the compact activating lever. Additionally, the intensity of the emitted light relating to a selected position of the rotary activator can be altered by the location of the lens of the flashlight relative to the case. Thus an operator can control the maximum intensity achievable with the activator by rotating the lens to a desired position relative to the case.

The activating lever usually provides both a clockwise and a counterclockwise rotation to permit the user to select different modes of operation. A cam is also normally provided with dual lobes or contours so that the power control function functions differently contingent upon the user selected direction of activator rotation.

Finally, the cam is usually designed to move a follower so that the rotary movement of the activator lever results in a linear movement of the follower resulting in a linear movement of the rheostat plunger. A linear movement of the follower is a desirable means of moving the rheostat plunger located at the light module because it avoids the application of rotary forces to the rheostat plunger. Unwanted rotary forces or torques can result in jamming and excess wear of the rheostat plunger which requires a linear movement. The cam can optionally move the rheostat plunger directly without employing a follower. This, as previously indicated, applies unwanted lateral forces to the plunger but it does beneficially reduce the manufacturing cost of the flashlight. Also for some embodiments the rheostat can employ a plunger that requires non-linear movement or a rotation in order to change its resistance.

Some embodiments employ a switch in place of the rheostat. This change reduces the cost but limits the output mode of the flashlight lamp to full "ON" or full "OFF".

Since flashlights are stored in a variety of locations, it is always a concern that the power control means can be accidentally activated. In order to avoid this problem, the current invention includes a lockout that prevents accidental movement of the activator lever from the "OFF" to the "ON" position. The lockout generally includes a spring loaded slider that automatically snaps into a mating track whenever the movable lever of the activator aligns with the "OFF" position. The lockout then prevents rotation of the lever until the operator deliberately moves the slider from the track. The lockout can also be designed to function without a spring. This would avoid the lockout slider automatically moving into the lockout mode each time the user aligned the activator lever with the "OFF" position. In this case, the operator would move the slider both into the locked position and out of the locked position according to his needs.

The activator can optionally include a seal such as an O-ring or U shaped seal to provide for a watertight or sealed flashlight.

Battery powered lights can create a hazard when they are sealed to be made watertight. Batteries can, on occasion, emit hydrogen gas. This gas can cause an explosion when subjected to a spark such as that generated by the switching of the lamp from "ON" to "OFF". If a flashlight is not sealed the hydrogen gas does not normally create a hazard because it can escape from the battery compartment. However, a watertight flashlight is sealed and the seal which prevents water from entering will normally prevent the hydrogen gas from escaping. The trapped hydrogen gas will collect and increase the pressure within the flashlight. This pressurized hydrogen presents an increased explosion hazard. It is desirable in some applications for the flashlight to remain watertight throughout an external water pressure range from zero pounds per square inch up to a high value such as one hundred pounds per square inch and to permit the hydrogen gas generated to escape the case at values of internal pressure above a very low value down to several pounds per square inch.

The current design includes a means to reduce the hazard of hydrogen gas. In one embodiment the current design achieves this objective by incorporating a seal which prevents water under external pressure from entering the flashlight while it permits hydrogen gas under low internal pressure to exit the flashlight. For example, if the flashlight of the current invention is used by an underwater sports diver, the external water pressure could extend up to one hundred pounds per square inch. In this instance, the seal of the present invention would form a seal and prevent water from entering the flashlight. On the other hand, if a user such as an auto mechanic installs a defective battery in the flashlight the battery can emit hydrogen gas. Upon accumulation within the case of the flashlight the hydrogen gas will slowly increase the internal pressure. In the current invention as this internal pressure exceeds a minimal value such as ten pounds per square Inch, the power control activator is designed to permit the hydrogen gas to bypass the seal thus limiting the internal pressure and reducing the explosive hazard. The current design achieves this result by configuring and dimensioning the components of the activator Including the seal to respond in a first way to an internal hydrogen pressure and to respond in a second way to an external water pressure. Component tolerances and cost considerations can limit the achievable pressure differential between external pressure seal and internal pressure hydrogen release.

Some embodiments of the current invention employ an O-ring seal and achieve a desired pressure differential by configuring and dimensioning the related components of the activator to permit the O-ring seal to change its shape. Other embodiments employ seals of other shapes such as a U seal which includes a configuration which abets a pressure differential.

It is, therefore, an object of this invention to provide a lighting device that comprises an activator which includes a plurality of positions to effect a plurality of intensities.

It is a further object of this invention to provide a flashlight with a range of output intensities from bright to dark controllable by an operator by movement of an activator with his thumb.

It is a further object of this invention to provide a lighting device comprising an activator that comprises a lockout slider that secures the lever of the activator in the "OFF" position and requires an operator to manually move the lockout slider to permit rotation of the lever or energizing of the lamp.

It is a further object of this invention to provide a lighting device including a rotary switch activator that includes a seal that seals the device and prevents water from entering when the device is submerged yet permits hydrogen gas within the device at low pressure to exit the device when the device is not submerged.

It is a further object of the current invention to provide a lighting device comprising a rotary activator whereby the resulting from a rotational position of the lever of the rotary activator can be controlled by a position of another element of the flashlight such as a bezel or lens.

BRIEF DESCRIPTION OF THE DRAWINGS

FIG. 7 is a sectional view of the lens 1 from FIG. 3.

FIG. 8 is a front view of battery B1 from FIG. 3.

FIG. 9 is a front view of the base spring 5 from FIG. 3.

FIG. 10 is a partial sectional view taken across line 10–10' of FIG. 1.

FIG. 19 is an enlarged view of the cam and follower portion of the FIG. 10 drawing.

FIG. 20 is a partial front view of the activator similar to FIG. 2 with the lever in the "OFF" position.

FIG. 21 is a partial sectional view of the flashlight similar to FIG. 10 showing the cam and follower positions of the activator with the lever positioned as shown in FIG. 20.

FIG. 22 is a partial front view of the activator similar to FIG. 2 except the lever is in the "ON" position.

FIG. 23 is a partial sectional view of the flashlight similar to FIG. 10 showing the cam and follower positions of the activator with the lever in the "ON" position as shown in FIG. 22.

FIG. 24 is a partial front view of the activator similar to FIG. 2 except the lever is in the momentary "ON" position.

FIG. 25 is a partial sectional view of the flashlight similar to FIG. 10 showing the cam and follower positions of the activator with the lever in the momentary "ON" position as shown in FIG. 24.

FIG. 26 is a partial front view of the activator similar to FIG. 2 except the lever is in the momentary "OFF" position.

FIG. 27 is a partial sectional view of the flashlight similar to FIG. 10 showing the cam and follower positions of the activator with the lever in the momentary "OFF" position as shown in FIG. 26.

FIG. 28 is a partial front view of the activator similar to FIG. 22 except lens 1 is unscrewed from the case a separation distance S.

FIG. 29 is a partial sectional view of the flashlight similar to FIG. 23. showing the cam and follower of the activator with the lever in the "ON" position and lens 1 unscrewed from the case separation distance S as shown in FIG. 28.

FIG. 30 is a partial sectional view of the activator similar to FIG. 17 except an external pressure is applied to the flashlight.

FIG. 31 is an enlarged partial sectional view of the activator similar to FIG. 17 except an internal pressure is applied to the flashlight.

FIG. 32 is a partial sectional view of the activator similar to FIG. 17 except the O-ring seal of FIG. 17 has been replaced with a U seal.

FIG. 33 is an enlarged partial sectional view of the U seal portion of the activator shown in FIG. 32 with an external pressure applied to the flashlight.

FIG. 34 is an enlarged partial sectional view of the U seal portion of the activator shown in FIG. 32 with an internal pressure applied to the flashlight.

FIG. 35 is an enlarged partial sectional view of the activator similar to FIG. 17 except the slider for the lockout is shown in the release position.

FIG. 36 is similar to FIG. 14 except the rheostat has been replaced by a push button switch of equal size and configuration.

DETAILED DESCRIPTION OF THE DRAWINGS

FIGS. 1 thru 31 show a preferred embodiment of the current invention described as flashlight 100. FIGS. 32 thru 35 show some of the possible modifications of the FIG. 1 flashlight which are also disclosed as part of the current invention.

Figure 1:
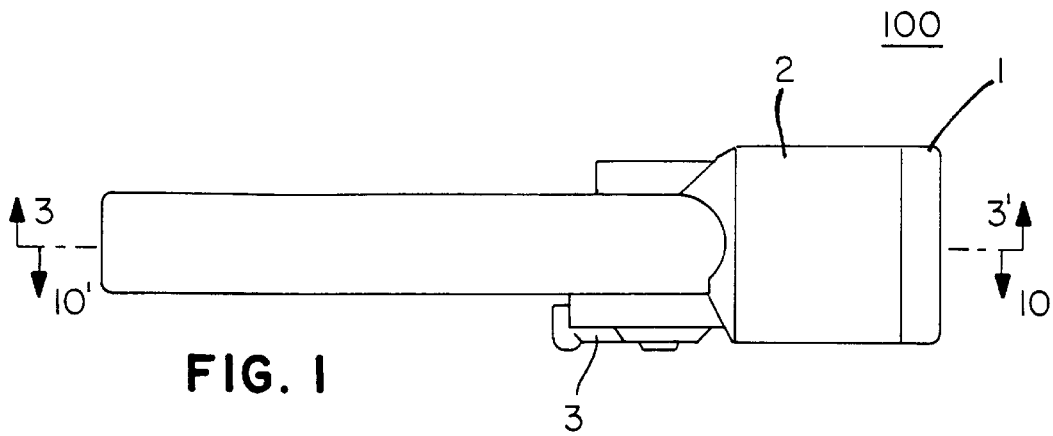
FIG. 1 is a plan view of flashlight 100 according to the current invent ion.
Figure 2:
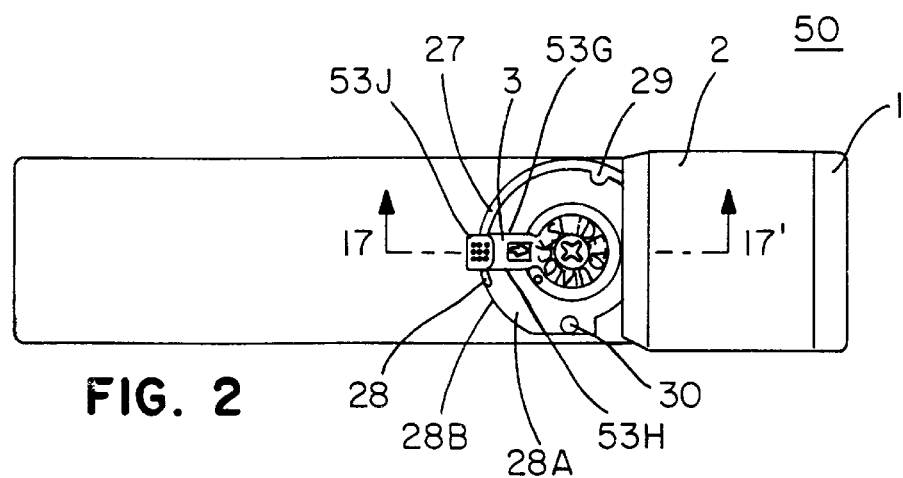
FIG. 2 is a front view of FIG. 1.

FIGS. 1 and 2 are plan and front views of flashlight 100. Flashlight 100 includes lens 1, case 2 and activator 3.

Figure 3:
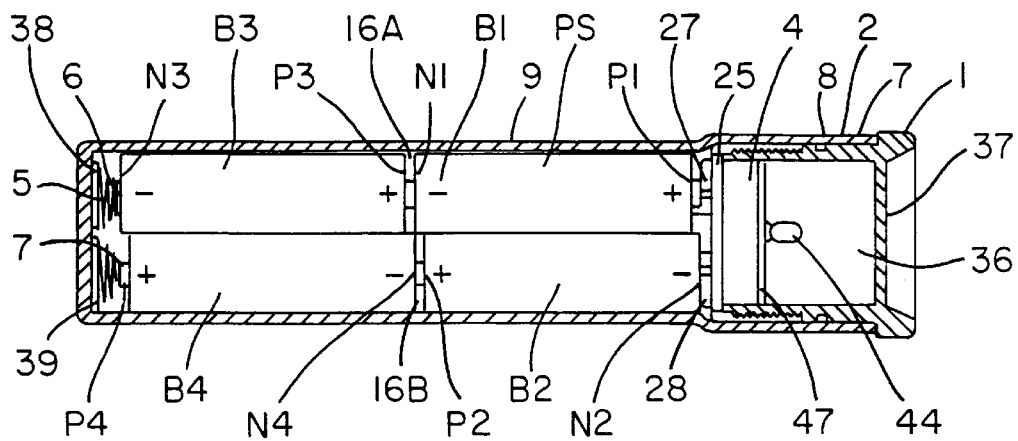
FIG. 3 is a partial sectional view taken across line 3–3' of FIG. 1.

FIG. 3 is a partial cross-sectional view taken across line 3–3' of FIG. 1. In FIG. 3 batteries B1 and B3 are installed in battery cavity 19A with their negative terminals N1 and N3 facing base spring 5. Coil 38 of spring 5 is designed to maintain pressure against battery B3 throughout the range of movement of lens 1. Batteries B2 and B4 are installed in battery cavity 19B with their positive terminals P2 and P4 facing base spring 5. Coil 39 of spring 5 is similarly designed to maintain pressure against battery B4 throughout the range of movement of lens 1. Thus throughout a range of movement battery rib 17 in case 2 prevents batteries B1 and B3 from falling into battery cavity 19B before batteries B2 and B4 are installed. Base spring 5 constructed of a metallic wire provides an electrically conductive path between the negative terminal N3 of battery B3 and the positive terminal P4 of battery B4. As a result of this connection batteries B1 through B4 are In a series configuration and operate as a single 6 volt battery or power supply PS with its positive terminal at the positive terminal P1 of battery B1 and its negative terminal at the negative terminal N2 of battery B2. O-ring seal 8 is disposed about lens 1 to form a watertight seal.

Figure 4:
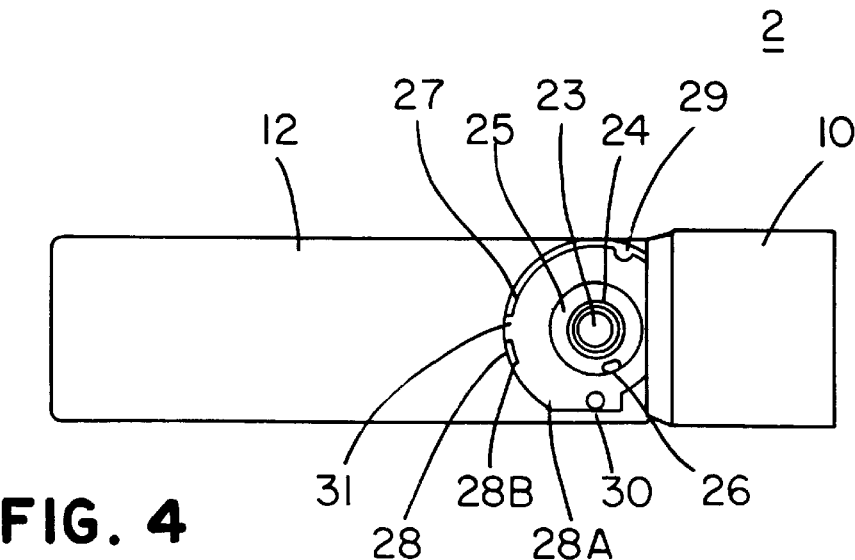
FIG. 4 Is a front view of the case only from FIG. 2.

FIG. 4 is a front view of only case 2 from FIG. 2.

Figure 5:
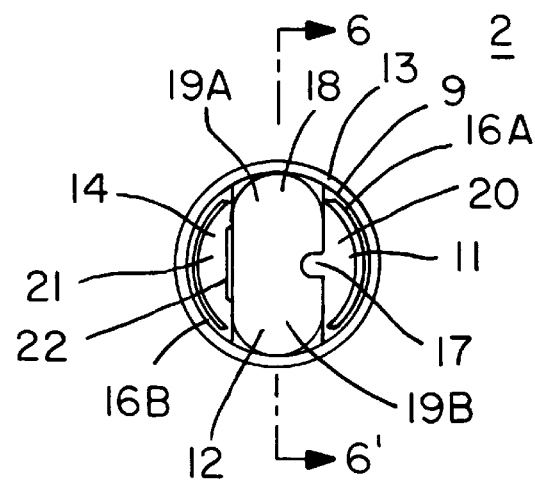
FIG. 5 is a right side view of the case shown in FIG. 4.

FIG. 5 is a right side view of the FIG. 4 case 2.

Figure 6:
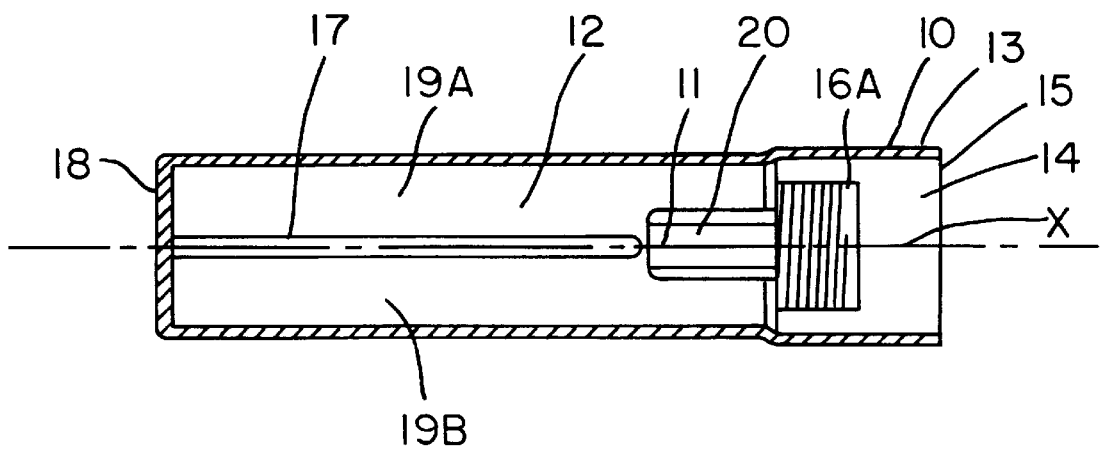
FIG. 6 is a sectional view taken across the lines 6–6' of FIG. 5.

FIG. 6 is a cross-sectional view of case 2 taken across line 6–6' of FIG. 5.

Referring to FIGS. 4 thru 6 case 2 includes: head section 10, offset section 11 and battery section 12 all of which are hollow. Case 2 can be injection molded of a high impact plastic as a single unitary component. Head section 10 includes: interior wall 13, head cavity 14, head opening 15 and thread sections 16A and 16B which are portions of a single continuous internal thread. Battery section 12 is elongated and includes: battery rib 17, base 18, and battery cavities 19A and 19B. Offset section 11 includes: offset cavity 20. Transition wall 21 connects head section 10, offset section 11 and battery section 12 such that they form an integral case 2. Transition wall 21 is substantially perpendicular to elongated battery section 12. Case 2 further comprises activator follower slot 22, activator hole 23, activator O-ring groove 24, activator momentary spring groove 25, activator momentary spring slot 26, activator "ON" wall 27, activator momentary wall 28, activator "ON" stop pin 29, activator momentary stop pin 30, activator lockout slot 31. Case 2 includes longitudinal axis X.

FIG. 7 is a cross-sectional view of lens 1 from FIG. 3. Lens 1 is molded of a transparent plastic and includes: lens grip ring 33, lens O-ring groove 34, lens thread 35, lens cavity 36 and lens cover 37.

FIG. 8 is a front view of battery B1 from FIG. 3. Battery B1 is typically 1½ volts and includes a positive terminal P1 and negative terminal N1. Battery B1 is similar to batteries B1 through B4 and can be any of a variety of commercial battery cells such as C, D, or AA.

FIG. 9 is a view of base spring 5 from FIG. 3. Base spring 5 is a single piece of electrically conductive wire formed into first and second coils 38 and 39 respectively. Coils 38 and 39 are each tapered compression springs. Base spring 5 could also be configured as a single coil or as a flat spring.

Figure 11:
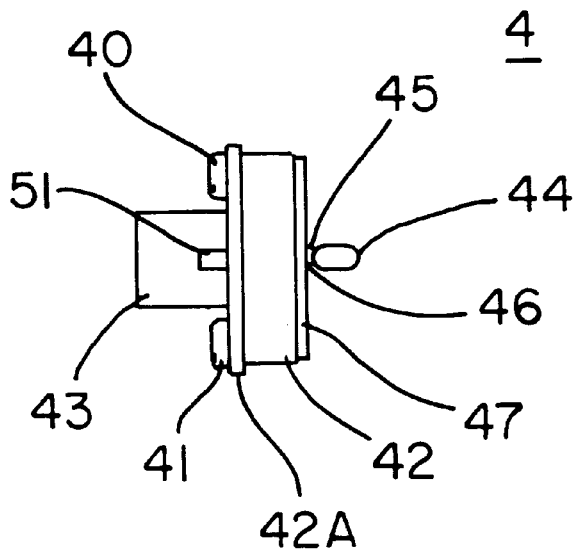
FIG. 11 Is a front view of the light module 4 from FIG. 3.
Figure 12:
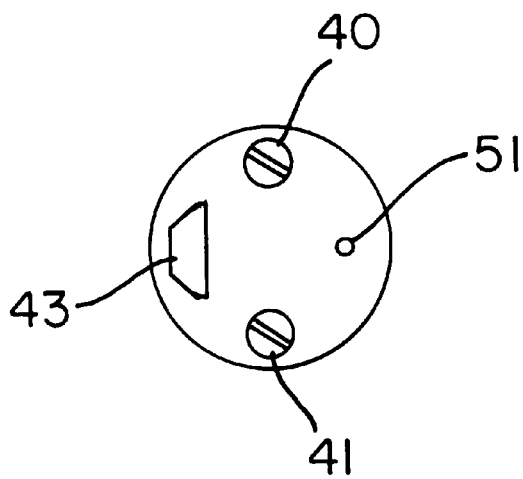
FIG. 12 is a left side view of the light module 4 of FIG. 11.
Figure 13:
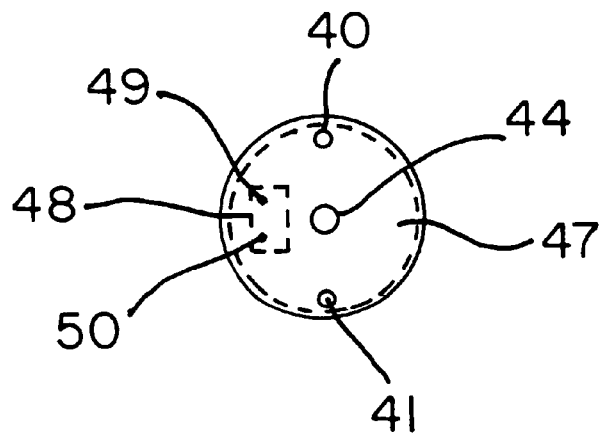
FIG. 13 is a right side view of the light module 4 of FIG. 11.

FIG. 10 Is a partial cross-sectional view of flashlight 100 taken across line 10–10' of FIG. 1. In FIG. 10 the top portions of batteries B1 and B2 have been removed to permit viewing of the cam 59 and follower 60 of activator 3. FIGS. 11, 12, and 13 are front, left side and right side views respectively of light module 4 from FIG. 3. Light module 4 includes positive screw terminal 40, negative screw terminal 41, body 42, body key 43, lamp 44, first lamp terminal 45, second lamp terminal 46, circuit board 47, rheostat 48, rheostat first terminal 49, rheostat second terminal 50 and rheostat plunger 51.

Figure 14:
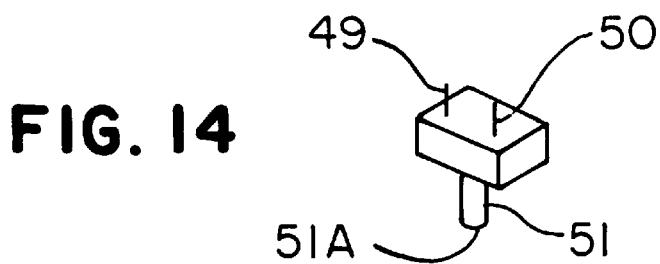
FIG. 14 is a perspective view of the rheostat from FIG. 13.

FIG. 14 is a perspective view of rheostat 48, from FIG. 13.

Figure 15:
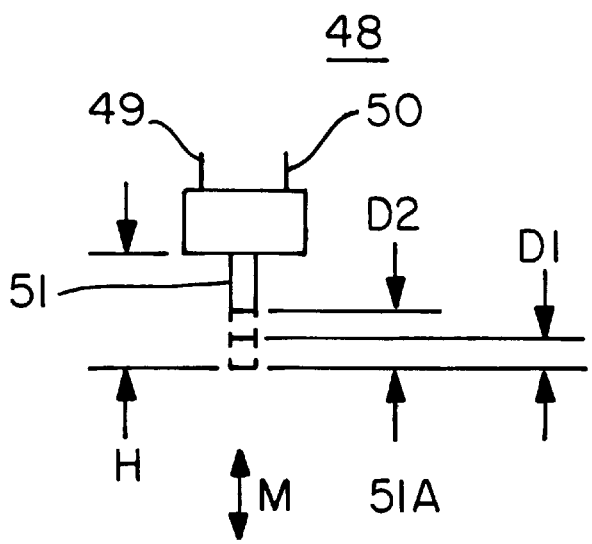
FIG. 15 Is a front view of the rheostat of FIG. 14.

FIG. 15 is a front view of rheostat 48 with rheostat plunger 51 shown at its natural extended height H and additionally at deflections D1 and D2. A linear movement of plunger 51 in the direction M changes its deflection. Rheostat plunger face 51A is contacted by activator 3 in a method to be later described in order to control the resistance of rheostat 48.

Figure 16:
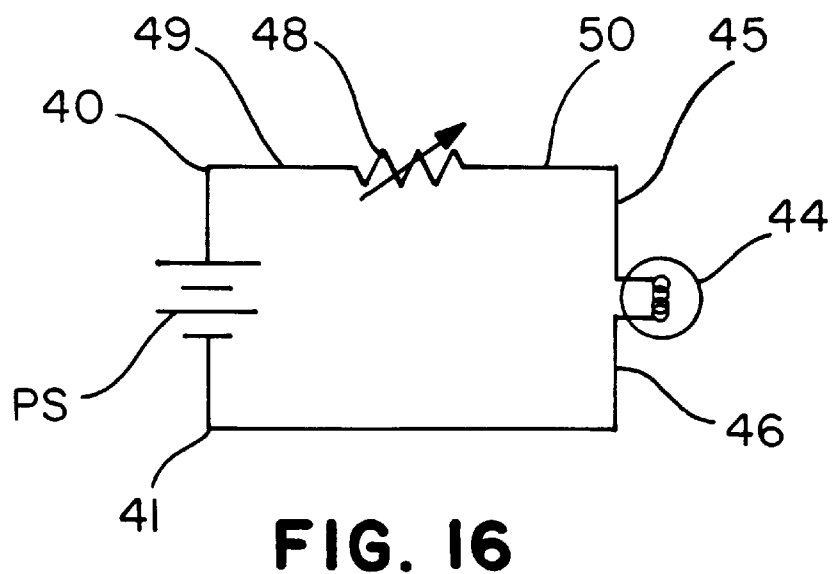
FIG. 16 is a schematic of the electrical circuit of the FIG. 1 flashlight.

FIG. 16 is a schematic of the circuit used in the FIG. 1 flashlight.

Referring to FIGS. 11 thru 16, circuit board 47 is designed using conductive tracks and commonly known layout methods to connect lamp 44, rheostat 48, power supply PS, positive screw terminal 40 and negative screw terminal 41 as shown in FIG. 16. Positive screw terminal 40 and negative screw terminal 41 contact the power supply PS to bring power to light module 4. They additionally fasten circuit board 47 to body 42 with rheostat plunger 51 protruding from body 42 and movable about light module body 42 upon the application of an appropriate axial force. Body 42 is usually injection molded of a high impact plastic. Rheostat 48 is a device that produces a variable resistance depending upon the linear deflection of plunger 51. Activator 3 presses on plunger face 51A to effect a deflection of plunger 51. The resistance of rheostat 48 can range from Infinite with rheostat plunger 51 at its natural extended height H without deflection to an intermediate resistance with plunger 51 at a deflection D1 from its natural height H to almost zero resistance with plunger 51 at full deflection D2 from its natural height H. Each particular use will have a desirable range of resistance which can almost always be easily achieved. This desirable range will depend upon the lamp 44, the power supply PS as well as the intensity of light needed. In the FIG. 1 lighting device, the resistance at the natural height H of plunger 51 is substantially infinite ohms. The resistance at a deflection D1 is approximately 30 ohms and the resistance at a deflection D2 is approximately 2 ohms. Due to the fact that the FIG. 1 embodiment of the current invention Is shown using an incandescent lamp, the rheostat is designed to maintain a minimal resistance. This reduces the probability of rheostat burn out. The FIG. 1 flashlight could alternately be supplied using a light emitting diode lamp and in that embodiment the resistance could range to a low value of zero ohms without damaging the power control means. When using an incandescent lamp, the resistance will usually change in a non-linear manner relative to the deflection of rheostat plunger 51 however linear relationships between the deflection of plunger 51 and the resistance can be employed to accommodate other lamps. Plunger 51 is spring loaded so that absent external forces it automatically returns to its natural extended height H. The spring forces created by rheostat plunger 51 when it is deflected must be balanced by frictional forces in activator 3 to be later described.

Figure 17:
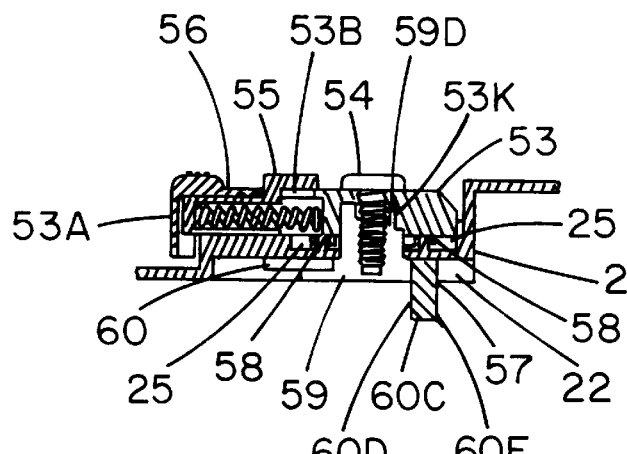
FIG. 17 is a partial sectional view of the activator of the FIG. 1 flashlight taken across line 17–17' of FIG. 2.

FIG. 17 is a partial cross-sectional view of activator 3 taken across line 17–17' of FIG. 2. In FIG. 17 it can be seen that lockout slide 55 and lockout slide tab 55B cover lever opening 53B when the lockout slide is in the lockout position. This prevents dirt from entering the lockout mechanism. Lockout slide 55 continues to prevent dirt from entering the lockout mechanism even when in the release position to be later described in FIG. 35.

Figure 18:
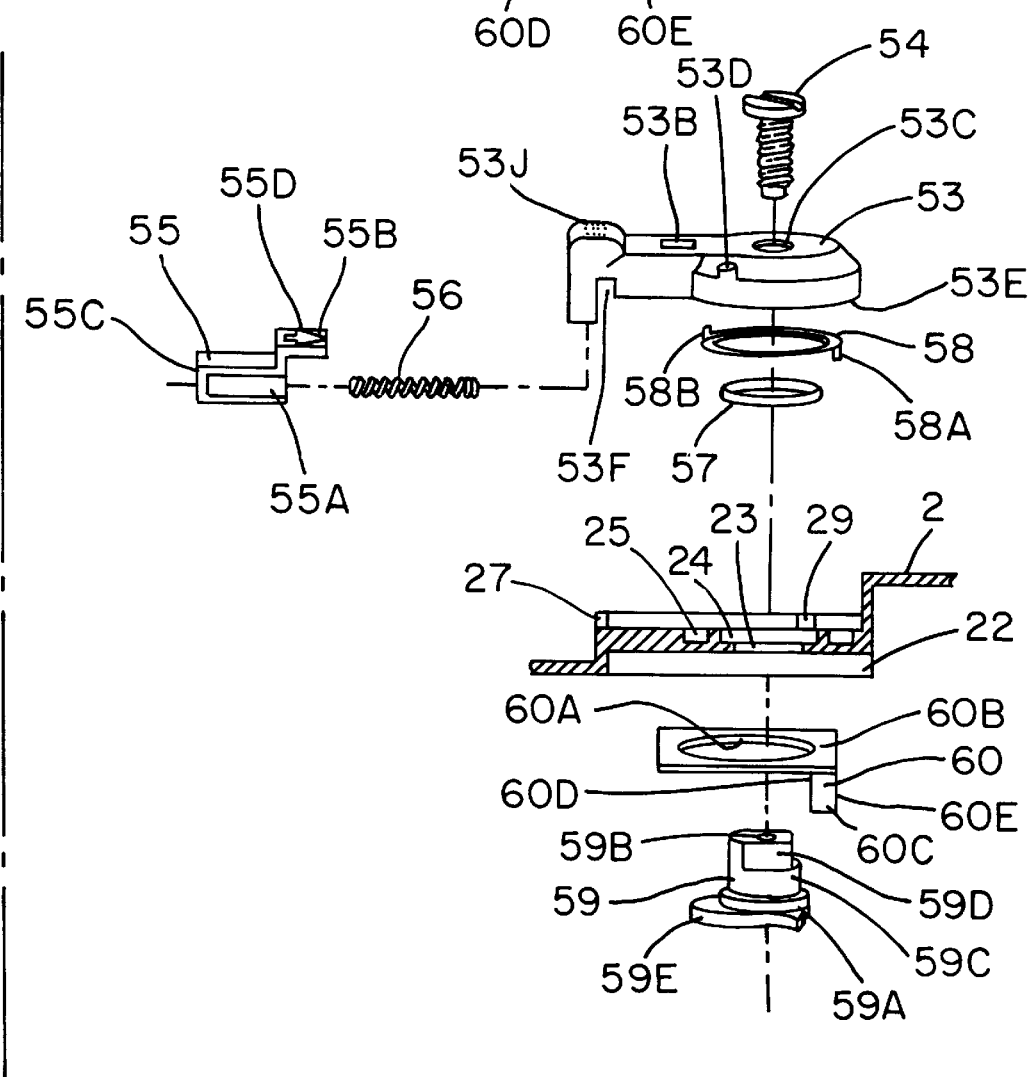
FIG. 18 is a assembly view showing the components of the FIG. 17 activator.

FIG. 18 is an assembly drawing of the FIG. 17 activator 3. Looking at FIGS. 17 and 18, activator 3 includes a lever 53, screw 54, lockout slide 55, lockout spring 56, activator O-ring seal 57, momentary torsion spring 58, cam 59 and follower 60. Looking at FIGS. 2, 4, 17, and 18, assembly of activator 3 is accomplished according to the following procedure. Place compression type lockout spring 56 in lockout slider opening 55A and with lockout spring 56 compressed insert lockout slide 55 in the underside of lever 53 in U shaped lever slot 53A such that lockout slide tab 55B passes through lever opening 53B. Place activator O-ring seal 57 in activator O-ring groove 24 of case 2. Place momentary spring 58 in activator momentary spring groove 25 of case 2 with momentary spring lower tab 58A in activator momentary spring slot 26 of case 2. Now place activator lever 53 onto case 2 with screw 54 through lever hole 53C and with momentary spring upper tab 58B in lever momentary spring through hole 53D starting at the bottom face 53E of lever 53. Now assemble cam 59 in follower 60 with cam hub 59A in follower hole 60A. Cam 59 and follower 60 assembly are disposed on the inside of case 2 in the activator follower slot 22 of FIG. 5 and the screw 54 and activator lever 53 assembly disposed on the outside of case 2. With these components positioned as disclosed thread screw 54 through case 2 activator hole 23 and into cam hole 59B until snug. Lever 53 can now be rotated about screw 54 by the user of flashlight 100 causing cam hub 59A to rotate within follower hole 60A.

When assembled cam shaft 59C will be disposed In activator hole 23 of case 2. Cam 59 also usually includes a cam key 59D which fits into a mating key slot 53K in activator lever 53 to assure that rotation of lever 53 results in an identical rotation of cam 59. Cam 59 additionally comprises a cam ramp 59E to be later described as the element that moves follower 60 which in turn deflects plunger face 51A. Follower 60 includes follower plate 60B which rests in activator follower slot 22. It also includes follower pin 60C which is moved by cam ramp 59E as it pushes against follower pin bottom 60D. Follower pin top 60E presses against and deflects plunger face 51A.

Looking again at FIGS. 2, 4, 17 and 18 activator 3 upon being mounted on case 2 is disposed with lever groove 53F of lever 53 partially encompassing activator "ON" wall 27. As lever 53 is rotated clockwise first lever side 53G comes into contact with activator "ON" stop pin 29 at the full activator "ON" position of the activator 3. At this position "ON" wall 27 of case 2 is within lever groove 53F of lever 53 and lockout slide face 55C is pushed against activator "ON" wall 27 by lockout spring 56. This is a result of the fact that lockout spring 56, a compression type spring, has been compressed during assembly such that it pushes lockout slide against activator "ON" wall 27. Thus, whenever lever 53 is rotated lockout slide face 55C rubs along activator "ON" wall 27 creating a friction or drag. This friction aids the design of the activator because it discourages movement of the lever. Hence if the lever is left in a particular position it will not be moved from that position without overcoming this friction force. This helps prevent accidental movement of lever 53 and inadvertent changes in lamp intensity. It also prevents spring forces to be later described which are associated with the rheostat plunger 51 from moving the lever 53.

As lever 53 is rotated counterclockwise slider 55 aligns with lockout slot 31 in activator "ON" wall 27 permitting slider 55 to automatically move into lockout slot 31 thus preventing lever 53 from further rotation. This is the full "OFF" position of activator 3 of the power control means of flashlight 100. The operator of flashlight 100 cannot subsequently light the flashlight without pushing on lockout slide 55 in the direction of lockout slide arrow 55D to compress lockout spring 56 thereby moving lockout slide 55 from lockout slot 31 while simultaneously rotating lever 53 about screw 54. It is noteworthy to realize that spring 56 could be omitted from the design. In that case slider 55 would be dimensioned to have a friction fit in lever slot 53. In this configuration the operator would manually move lockout slide 55 into lockout slot 31 whenever he wished to lock lever 53 in the "OFF" position. He would also have to manually move lockout slide 55 out of lockout slot 31 before he could light flashlight 100. The lockout feature of the current invention permits flashlight 100 to be stored with other camping gear or in a knapsack while in the full "OFF" position without accidentally being turned "ON".

If the operator rotates lever 53 past lockout slot 31 lockout slide 55 will rub along and rotate past momentary "ON" wall 28 and then upon continued rotation and as a result of forces from compressed lockout spring 56 move into momentary slot 28A. This movement of lockout slide 55 will—due to the large size of momentary slot 28A—not prevent further counterclockwise rotation of lever 53. At this rotational position of lever 53 further counterclockwise rotation of lever 53 will wind up momentary torsion spring 58. Eventually, upon further counterclockwise rotation of lever 53 second lever side 53H will contact momentary stop pin 30 to prevent further rotation of lever 53. This represents the full momentary "ON" position. If the operator of the flashlight releases lever 53 it will—due to the previous winding up of momentary torsion spring 58—automatically rotate lever 53 clockwise until torsion spring 58 returns to its natural state. Lever 53 will not automatically rotate back to the full "OFF" position even when urged to do so by the previously wound momentary torsion spring 58 because slider 55 which has been extended by lockout spring 56 will be contacted by momentary wall edge 28B. If the operator wishes to move lever 53 to the full "OFF" position, he will be required to move slider 55 as previously described in the direction of slider arrow 55D. If lever 53 is in the momentary "OFF" position lamp 44 will generally be extinguished as it is when lever 53 is in the full "OFF" position. The momentary "OFF" position of lever 53 is designed to be at angle A to the longitudinal axis of flashlight 100 so that an operator can use his thumb to easily apply to lever 53 a force which will create a torque about screw 54 to rotate lever 53 counterclockwise to create a flashing effect from lamp 44 by a means to be later described. Additionally, since lever 53 returns automatically to the momentary "OFF" position the operator is not required to pull it back with his thumb. Also if the operator is a soldier and he accidentally drops flashlight 100 it will automatically turn off avoiding a possible breach in security. Lever 53 additionally includes a lever thumb pad 53J which serves to permit the operator to easily move lever 53 with his thumb. The thumb pad 53J is usually a greater distance from the case 2 than lockout slide tab 55B to protect lockout slide tab 55B from accidental movement.

Having previously discussed the various positions of lever 53 relative to the exterior of flashlight 100, it is now appropriate to discuss how each position of lever 53 affects the intensity of lamp 44. In that regard first it must be realized that lever 53 is securely attached to cam 59 employing cam key 59D. Thus rotation of lever 53 causes cam 59 to also rotate. Rotation of cam 59 results in a linear movement of follower 60 within activator follower slot 22 and substantially parallel to longitudinal axis X of case 2. Follower 60 in turn pushes on plunger 51 of rheostat 48 changing the deflection of plunger 51 and thereby changing the resistance of rheostat 48 to regulate the voltage applied to lamp 44 and vary its intensity. The details of this process can be understood by looking closely at FIG. 19 and also at FIGS. 1 thru 19. FIG. 19 is an enlargement of cam 59 and follower 60 portion of FIG. 10. In FIG. 19 cam 59 is in the "OFF" position of lever 53 as shown in FIG. 2. In this position cam ramp "OFF" point 59F of cam ramp 59E is contacting follower pin bottom 60D of follower 60 thereby pushing follower pin 60 towards rheostat plunger 51 where follower pin top 60E is Just contacting rheostat plunger face 51A. In FIG. 19 rheostat plunger 51 has therefore not been deflected and is at its natural height H. Rheostat 48 is therefore at infinite ohms across rheostat terminals 49 and 50 resulting in zero voltage across lamp 44.

Cam ramp 59E also includes: a momentary "OFF" point 59G, cam ramp "ON" portion 59H and cam ramp momentary "ON" portion 59J.

Referring to FIGS. 20 and 21, lever 53 is in the "OFF" position and cam 59 is positioned as previously described in FIG. 19. Looking at FIGS. 22 and 23, lever 53 is in the "ON" position with cam ramp "ON" portion 59H contacting follower pin bottom 60D of follower pin 60 thereby pushing follower pin 60 towards rheostat plunger 51 where follower pin top 60E is pushing rheostat plunger 51 and deflecting it to deflection D2. At this deflection rheostat 48 is at approximately 2 ohms resulting in almost six volts across lamp 44 making lamp 44 at approximately full brightness. It can be seen from the gradual curve of cam ramp portion 59H that as lever 53 is rotated from the "OFF" position of FIG. 20 to the "ON" position of FIG. 20 rheostat plunger 51 gradually changes its location starting at no deflection and at its natural height H to full deflection D2. If lever 53 were only partially rotated towards the "ON" position rheostat plunger 51 would only be partially deflected such as to a deflection D1 resulting in rheostat 48 having a resistance of 6 ohms resulting in approximately 4.5 volts applied to lamp 44. This applied voltage would light lamp 44 at a reduced intensity. In a similar fashion lever 53 could be moved to and left at numerous positions between the "OFF" and "ON" positions to apply numerous voltages to lamp 44 and thereby light lamp 44 at numerous intensities. As lever 53 is slowly rotated from "OFF" to "ON" the voltage applied to lamp 44 slowly increases. The rate of voltage change depends in part upon the shape of cam ramp portion 59H. A steep slope will effect a rapid change in the intensity of lamp 44 in response to a defined rotation of lever 44. Generally, the slope of cam ramp portion 59H is gradual so that the operator can easily move lever 53 at a rate of rotation which will slowly change the intensity of lamp 44.

Referring to FIGS. 24 and 25, lever 53 is in the full momentary "ON" position with cam ramp full momentary "ON" portion 59J contacting follower pin bottom 60D of follower pin 60 thereby pushing follower pin 60 towards rheostat plunger 51 and deflecting it to deflection D2. This is the same deflection distance as found in FIG. 23 and therefore lamp 44 is at the same intensity as described in FIG. 23 with lever 53 in the full "ON" position. This is an acceptable design however some users may wish the flashlight to emit at different intensities at the full "ON" and the momentary "ON". This is easily achieved by adjusting the contours of the cam ramp momentary "ON" portion 59I and the cam ramp full "ON" portion to create different deflections of rheostat plunger 51. It should be noted from FIG. 19 that the con tour of cam ramp momentary "ON" portion 59I comprises a steeper slope than the contour of cam ramp full "ON" portion 59H. Due to this steeper slope a particular rotational movement of lever 53 will more quickly change the voltage applied to lamp 44. This is a desirable feature when a user of flashlight 100 wishes to emit a quick bright flash of light. Thus a gradual slope is employed for the contour of cam ramp full "ON" portion 59H of cam 59 to permit a gradual change In intensity and a steep slope is employed for the contour of cam ramp momentary "ON" portion 59I of cam 59 to permit the user to quickly change the intensity irrespective of the fact that he must rotate lever 53 which Is a relatively slow process.

Looking at FIGS. 26 and 27 one sees flashlight 100 with lever 53 in the momentary "OFF" position with the cam 59, cam ramp momentary "OFF, point 59G contacting follower pin 60 such that rheostat plunger 51 is not deflected and at its natural height H. This is the same location rheostat plunger 51 had in FIG. 21 effectively applying zero voltage to lamp 44. Thus lamp 44 is extinguished. As previously disclosed in this position lever 53 will—due to momentary torsion spring 58—automatically return—when released by the operator to the momentary "OFF" position. Thus the momentary "OFF" position is provided so that lamp 44 is extinguished. However, in this mode the operator can rotate lever 53 to create a pulse or flash of light without having to release lockout slide 55.

Referring now to FIGS. 22, 23, 28, and 29 it can be seen that in FIGS. 22 and 28 lever 53 is at the same "ON" position. Yet looking at FIGS. 23 and 29, it can be seen that rheostat plunger 51 is at different deflections. Specifically, in FIG. 23 rheostat plunger 51 exhibits a greater deflection. This from prior discussions means that in FIG. 23 rheostat 48 provides a first resistance value and in FIG. 29 rheostat 48 provides a second and larger resistance value. Thus lamp 44 in the FIG. 23 configuration will be brighter than lamp 44 in the FIG. 29 configuration. The difference between FIGS. 22-23 ad FIGS. 28-29 can be seen in the separation distance S in FIGS. 28-29. Separation distance S represents the distance lens 1 has been unscrewed from case 2. As previously described even when partially unscrewed from case 2, lens 1 remains watertight. However, as lens 1 is separated from case 2 light module 4 which is pushed into lens 1 by forces created by base spring 5 moves away from follower 60. This movement of light module 4 away from follower 60 reduces the deflection of rheostat plunger 51 which would normally result from a selected position of activator lever 53. In the aforementioned figures the selected position of activator lever 53 is the "ON" position. Thus by unscrewing lens 1 and increasing the separation distance S between the lens 1 and case 2, the operator can limit the intensity attainable when activator lever 53 is placed in the "ON" position. Actually for any position of activator lever 53 the separation distance S can be used to limit the attainable Intensity.

Additionally for the same reasons previously discussed if activator lever 53 is placed in the "ON" position the operator can rotate lens 1 and use it to control the intensity of lamp 44. This is an excellent feature for an operator with gloves or cold hands who cannot feel the position of lever 53.

Having now disclosed the means by which activator 3 is used by an operator to regulate the intensity of lamp 44 we will now consider the function of a sealing means to assure a watertight flashlight. In that regard refer to FIGS. 17, 18, 30, and 31. FIGS. 30 and 31 are enlarged views of the sealing portion of activator 3. After assembly as disclosed in FIG. 18 and with an external water pressure PE of up to one hundred pounds per square inch applied to flashlight 100 activator 3 appears as shown in FIG. 30.

In FIG. 30 activator O-ring seal 57 is pressed into the activator O-ring groove 24 by the activator lever bottom face 53E such that a watertight seal is made about the activator O-ring seal 57 and both activator O-ring groove 24 and cam shaft 59C at all points typified by O-ring groove seal point 24A. Clearance C resulting from designed tolerances in the components of activator 3 appears between cam 59 and case 2 where the clearance does not degrade sealing.

Looking now at FIG. 31 which Is identical to FIG. 30 except the external water pressure PE has been replaced with an internal hydrogen gas pressure PI of a minimal value such as ten pounds per square inch. In FIG. 31, the Internal pressure PI shifts lever 53 such that the clearance C now appears between lever bottom face 53E and activator O-ring seal 57. Activator O-ring seal 57 is also moved by internal pressure PI so that it is no longer pressed into activator O-ring groove 24. In this configuration, due to the taper of activator O-ring wall 24B of O-ring groove 24, the hydrogen gas can escape case 2 past activator 0ring groove seal point 24A. This design differs from classical prior art O-ring seals because they do not provide clearances which release hydrogen gas passed the seal as a result of pressure reversal.

FIGS. 32, 33, and 34 disclose an alternate method to seal activator 3. In this alternate embodiment in place of the O-ring seal 57 disclosed in similar drawings FIGS. 18, 30, and 31 an activator U-ring seal 57A has been substituted. No special clearances between the activator components are shown or required other than to permit free movement of the components. Even without special clearances hydrogen gas will pass between these components freely if a seal is not present.

Looking at FIG. 33 which is identical to FIG. 32 except an external water pressure PE is applied to flashlight 100 one sees that the external pressure will enter activator O-ring groove 24 and spread the legs 57B of the U seal 57A such that they seal against the activator O-ring groove wall 24B.

Now looking at FIG. 34 which is identical to FIG. 32 except an internal hydrogen pressure PI is applied it can be seen that the seal has been broken. In FIG. 34 the internal pressure moves the flexible legs 57B of the U seal 57A such that they move away from the activator O-ring groove wall 24B and cam shaft 59C to permit the hydrogen gas to escape. U seal 57A is flexible and will break the seal without a movement of other components of activator 3. The sealing means disclosed in FIGS. 30, 31, 33, and 34 represent only two of numerous methods to create a watertight light which still permits the hydrogen gas to escape. The sealing method permitting the release of the hydrogen is efficiently incorporated into the activator but could also be supplied as a separate part of flashlight 100.

FIG. 35 is similar to FIG. 17 except the lockout slider is shown moved by the operator using lockout slide tab 55B to permit release of the lockout and rotation of lever 53. In this configuration lockout spring 56 is compressed. Also activator "ON" wall 27 can freely pass through lever groove 53F. Finally lockout slide 55 blocks the entry of dirt into lever opening 533 preventing the entry of dirt into the lockout mechanism. In fact all components of activator 3 are designed to preclude dirt from getting into the mechanism. This assures reliability even in dirty environments.

Figure 36:
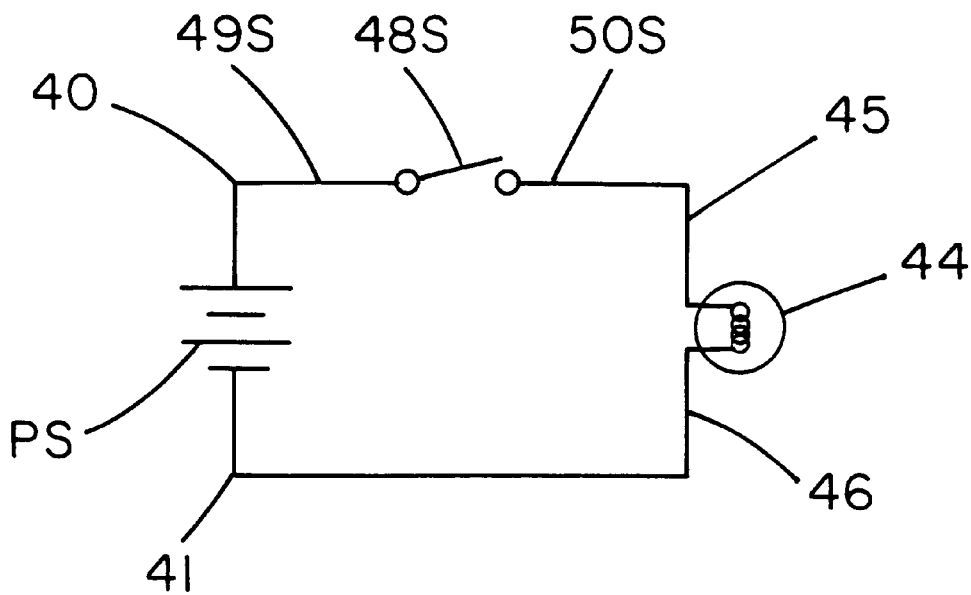
FIG. 36 is a schematic of an alternate circuit that could replace the circuit shown in FIG. 16.
Figure 37:
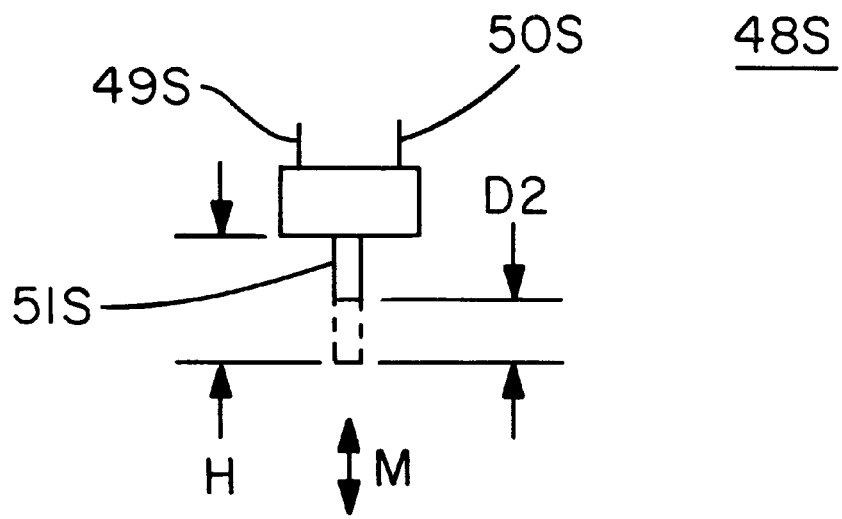
FIG. 37 is a perspective view of a push button switch that could be substituted in the FIG. 36 circuit as a replacement for the rheostat shown in FIG. 15.

FIG. 36 is a drawing of an alternate circuit which uses a spring loaded momentary "ON" switch 48S in place of rheostat 48. FIG. 37 is a front view of switch 48S. It includes switch first terminal 49S, switch second terminal 50S and switch plunger 51S. Plunger 51S has a natural height H at which it is "OFF". Upon a linear axial movement M to a deflection D2 of switch plunger 515 switch 48S turns "ON". Switch 48S can be substituted for rheostat 48 and reduce the cost of flashlight 100 however, lamp 44 will only have one intensity.

Having now fully set forth the preferred embodiments and certain modifications of the concept underlying the present invention, various other embodiments as well as certain variations and modifications of the embodiment herein shown and described will obviously occur to those skilled in the art upon becoming familiar with said underlying concept.

It is to be understood, therefore, that within the scope of the appended claims, the invention may be practiced otherwise than as specifically set forth herein.

What is claimed is:

1. A lighting device comprising:
   a light module having a lamp, a first contact and a second contact, the contacts being connected to a power supply having a voltage;
   said light module having a switch, said switch having a movable element;
   said power supply, said lamp, said contacts and said switch forming a circuit assembly;
   a case at least partially supporting said light module;
   an activator rotatably connected to said case and disposed about said movable element for moving said movable element about said light module in response to a rotation of said activator;
   said activator at a first rotational position about said case establishing a first disposition of said movable element about said light module, said switch at said first disposition of said movable element being at an "off" position, the contacts connected to said power supply and said lamp extinguished; and
   said activator at a second rotational position about said case establishing a second disposition of said movable element about said light module, said switch at said second disposition of said movable element being at an "on" position, the contacts connected to said power supply and said lamp emitting light.

2. The lighting device of claim 1, wherein said power supply having a voltage is a battery means, said battery means having a positive terminal directly contacting said first contact on said light module and a negative terminal directly contacting said second contact on said light module, said battery means being supported by said case.

3. A lighting device according to claim 1, which further includes:
   said activator comprising a cam, said cam establishing a deflection of said movable element in response to a rotational disposition of said activator.

4. A lighting device according to claim 1, which further includes:
   said activator comprising a cam and a follower, said cam establishing a disposition of said follower in response to a rotational disposition of said activator, said disposition of said follower establishing a deflection of said movable element.

5. A lighting device according to claim 1, which further includes:
   said activator additionally comprising a cam having a first ramp and a second ramp, said first ramp effecting moving said movable element in response to a rotation of said activator in a first rotational direction about said first rotational position of said activator, said second ramp effecting moving said movable element in response to a rotation of said activator in a second rotational direction about said first rotational position of said activator, said first ramp having a slope steeper than said second ramp.

6. A lighting device according to claim 1, which further includes:
   said activator at a third rotational position at a first angle about said case in a first rotational direction about said first rotational position effecting a first deflection of said movable element, said activator at a fourth rotational position of said first angle in a second rotational direction about said first rotational position effecting a second deflection of said movable element different than said first deflection of said movable element.

7. A lighting device according to claim 1, which further includes:
   said activator at a third rotational position at a first angle about said case in a first rotational direction about said first rotational position effecting a first deflection of said movable element, said activator at a fourth rotational position of a second angle in a second rotational direction about said first position effecting a second deflection of said movable element, a spring connected to said activator, said spring deflected at said third position of said activator, said activator directed by a force from said spring to return to said first rotational position.

8. A lighting device according to claim 1, which further includes:
   a lockout element attached to said case and movable relative to said case, said lockout element aligning with a lockout opening at said first rotational position of said activator and movable to a lock position within said lockout opening; and
   said activator rotationally fixed relative to said case with said lockout element within said lockout opening.

9. A lighting device according to claim 1, which further includes:
   a lockout element attached to said case and movable relative to said case, said lockout element aligning with a lockout opening at said first rotational position of said activator, said lockout opening in a wall of said case, said lockout element comprising a slider located in a slot of a lever of said activator, said lockout element movable to a lock position within said lockout opening; and
   said activator rotationally fixed relative to said case with said lockout element in said lock position.

10. A lighting device according to claim 1, which further includes:
    a lockout element attached to said case and movable relative to said case, said lockout element aligning with a lockout opening at said first rotational position of said activator, said lockout opening in a wall of said case, said lockout element comprising a slider located in a slot of a lever of said activator, said lockout element movable to a lock position within said lockout opening, said lockout element extending past said wall of said case into an opening in said lever; and
    said activator rotationally fixed relative to said case with said lockout element in said lock position.

11. A lighting device according to claim 1, which further includes:
    a lockout element attached to said case and movable relative to said case, a spring connected to said lockout element, said spring deflected and applying a force directed to move said lockout element into a lockout opening, said lockout element aligning with said lockout opening at said first rotational position of said activator and movable to a lock position within said lockout opening,; and
    said activator rotationally fixed relative to said case with said lockout element in said lock position.

12. A lighting device according to claim 1, which further includes:
    a sealing means disposed in an opening between said activator and said case;
    upon an external case pressure exceeding an internal case pressure, said sealing means being at a first disposition relative to said opening and withstanding a first pressure differential between said interior case pressure and said exterior case pressure; and upon the internal case pressure exceeding the external case pressure, said sealing means being at a second disposition relative to said opening and withstanding a second pressure differential between the internal case pressure and the external case pressure, said second pressure differential being less than said first pressure differential, wherein, in said first disposition, said sealing means prevents ingress of water into the case and in said second disposition, said sealing means allows escape of gas from within said case.

13. A lighting device according to claim 1, which further includes:

said case having an activator wall, a spring compressed approximately between an axis of rotation of said activator and said activator wall and applying a force upon said activator wall.

14. A lighting device according to claim 1, which further includes:

a threaded element rotatably connected to said case and disposed about said light module for establishing a deflection of said movable element about said light module in response to a rotational disposition of said threaded element.

15. A lighting device according to claim 1, which further includes:

a lens rotatably connected to said case and disposed about said light module for establishing a deflection of said movable element about said light module in response to a rotational disposition of said lens.

16. A lighting device according to claim 1, which further includes:

said movable element additionally having a linear movement.

17. A lighting device according to claim 1, which further includes:

said movable element comprising a plunger, a spring connected to said light module establishing a position of said plunger.

18. A lighting device according to claim 1, which further includes:

said activator comprising a shaft and rotatably connected to said case through a hole in said case;

a sealing means disposed in an opening between said activator and said case;

upon an external case pressure exceeding an internal case pressure, said sealing means being at a first disposition relative to said opening and withstanding a first pressure differential between said interior case pressure and said exterior case pressure; and upon the internal case pressure exceeding the external case pressure, said sealing means being at a second disposition relative to said opening and withstanding a second pressure differential between the internal case pressure and the external case pressure, said second pressure differential being less than said first pressure differential, wherein, in said first disposition, said sealing means prevents ingress of water into the case and in said second disposition, said sealing means allows the escape of gas from within said case.

19. A lighting device comprising:

a light module having a lamp, said light module being connected to a power supply having a voltage;

said lamp emitting light in response to the application of at least a first voltage;

said light module having an electrical controller, said electrical controller having a variable resistor and a movable element movable about said light module, said electrical controller applying a selected voltage to said lamp in response to a disposition of said movable element about said light module;

a circuit assembly comprising said lamp and said electrical controller;

a case at least partially supporting said light module;

an activator rotatably connected to said case and disposed about said electrical controller for moving said movable element about said light module in response to a movement of said activator; and said activator at a plurality of positions establishing a corresponding plurality of dispositions of said movable element about said light module, said electrical controller in response to said plurality of dispositions applying a plurality of voltages greater than said first voltage to said lamp, wherein the intensity of light is progressively increased and controlled.

20. The lighting device of claim 19, wherein said power supply having a voltage is a battery means, said battery means having a positive terminal directly connected to a first contact on said lamp module and a negative terminal directly connected to a second contact on said lamp module, said battery means being supported by said case.

21. An electrical device according to claim 19, further comprising:

said activator comprising a cam, said cam establishing a deflection of said movable element in response to a rotational disposition of said activator.

22. A lighting device according to claim 19, which further includes:

said activator comprising a cam and a follower, said cam establishing a disposition of said follower in response to a rotational disposition of said activator, said disposition of said follower establishing a deflection of said movable element.

23. A lighting device according to claim 19, which further includes:

said activator additionally comprising a cam having a first ramp and a second ramp, said first ramp effecting moving said movable element in response to a rotation of said activator in a first rotational direction about an "off" position of said activator, said second ramp effecting moving said movable element in response to a rotation of said activator in a second rotational direction about said "off" position of said activator, said first ramp having a slope steeper than said second ramp.

24. A lighting device according to claim 19, which further includes:

said activator having an "off" position, said activator at a first rotational position of an angle in a first rotational direction about said "off" position effecting a first deflection of said movable element, said activator at a second rotational position of said angle in a second rotational direction about said "off" position effecting a second deflection of said movable element different than said first deflection of said movable element.

25. A lighting device according to claim 19, which further includes:

said activator having an "off" position, said activator at a first rotational position of an angle in a first rotational direction about said "off" position effecting a first deflection of said movable element, said activator at a second rotational position of a second angle in a second rotational direction about said "off" position effecting a second deflection of said movable element, a spring connected to said activator, said spring deflected at said second rotational position of said activator, said activator directed by a force from said spring to return to said "off" position.

26. A lighting device according to claim 19, which further includes:

a lockout element attached to said case and movable relative to said case, said lockout element aligning with a lockout opening at an "off" position of said activator and movable to a lock position within said lockout opening; and said activator rotationally fixed relative to said case with said lockout element within said lockout opening.

27. A lighting device according to claim 19, which further includes:

a lockout element attached to said case and movable relative to said case, said lockout element aligning with a lockout opening at an "off" position of said activator, said lockout opening in a wall of said case, said lockout element comprising a slider located in a slot of a lever of said activator, said lockout element movable to a lock position within said lockout opening; and said activator rotationally fixed relative to said case with said lockout element in said lock position.

28. A lighting device according to claim 19, which further includes:

a lockout element attached to said case and movable relative to said case, said lockout element aligning with a lockout opening at an "off" position of said activator, said lockout opening in a wall of said case, said lockout element comprising a slider located in a slot of a lever of said activator, said lockout element movable to a lock position within said lockout opening, said lockout element extending past said wall of said case into an opening in said lever; and said activator rotationally fixed relative to said case with said lockout element in said lock position.

29. A lighting device according to claim 19, which further includes:

a lockout element attached to said case and movable relative to said case, a spring connected to said lockout element, said spring deflected and applying a force directed to move said lockout element into a lockout opening, said lockout element aligning with said lockout opening at an "off" position of said activator and movable to a lock position within said lockout opening,; and said activator rotationally fixed relative to said case with said lockout element in said lock position.

30. A lighting device according to claim 20, which further includes:

a lockout element attached to said case and movable relative to said case, said lockout element aligning with a lockout opening at an "off" position of said activator and movable to a lock position within said lockout opening;

said activator rotationally fixed relative to said case with said lockout element within said lockout opening; and said lockout element comprising a slider movably located in a slot in a lever of said activator.

31. A lighting device according to claim 19, which further includes:

said case having an activator wall, a spring compressed approximately between an axis of rotation of said activator and said activator wall and applying a force upon said activator wall.

32. A lighting device according to claim 19, which further includes:

a threaded element rotatably connected to said case and disposed about said light module for establishing a deflection of said movable element about said light module in response to a rotational disposition of said threaded element.

33. A lighting device according to claim 19, which further includes:

a lens rotatably connected to said case and disposed about said electrical controller for establishing a deflection of said movable element about said light module in response to a rotational disposition of said lens.

34. A lighting device according to claim 19, which further includes:

said movable element additionally having a linear movement.

35. A lighting device according to claim 19, which further includes:

said movable element comprising a plunger, a spring connected to said light module establishing a position of said plunger.

36. A lighting device according to claim 19, which further includes:

said activator comprising a shaft and rotatably connected to said case through a hole in said case;

a sealing means disposed in an opening between said activator and said case;

upon an external case pressure exceeding an internal case pressure, said sealing means being disposed at a first disposition relative to said opening and withstanding a first pressure differential between said interior case pressure and said exterior case pressure; and upon the internal case pressure exceeding the external case pressure, said sealing means being disposed at a second disposition relative to said opening and withstanding a second pressure differential between the internal case pressure and the external case pressure, said second pressure differential being less than said first pressure differential, wherein, in said first disposition, said sealing means prevents ingress of water into the case and in said second disposition, said sealing means allows the escape of gas from within said case.

37. A lighting device according to claim 19, which further includes:

a threaded element rotatably connected to said case and disposed about said electrical controller for establishing a disposition of said movable element about said light module;

said threaded element at a first rotational position establishing a first disposition of said movable element, said electrical controller in response to said first disposition applying at least said first voltage to said lamp; and said threaded element at a second rotational position establishing a second disposition of said movable element, said electrical controller in response to said second disposition applying a second voltage greater than said first voltage to said lamp.

38. A lighting device according to claim 19, which further includes:

said electrical controller comprising a rheostat.

39. A lighting device comprising:

a light module having a lamp, said light module being connected to a power supply having a voltage;

said lamp emitting light in response to the application of at least a first voltage;

an electrical controller having a movable element and a variable resistor, said electrical controller applying a selected voltage to said lamp in response to a disposition of said movable element;

a circuit assembly comprising said lamp and said electrical controller;

a case at least partially supporting said light module;

a threaded element rotatably connected to said case and disposed about said electrical controller for moving said movable element in response to a rotation of said threaded element; and said threaded element at a plurality of rotational positions establishing a corresponding plurality of deflections of said movable element, said electrical controller in response to said plurality of deflections applying a plurality of voltages greater than said first voltage to said lamp, wherein the intensity of light is progressively increased and controlled.

40. A lighting device according to claim 39, which further includes:

said threaded element is attached to a lens.

41. A lighting device comprising:

a case supporting a light module having a lamp therein, a battery having a voltage being disposed within said case electrically connected to said lamp, a rheostat being electrically connected in series with said battery and said lamp, said rheostat having a movable plunger attached thereto to change the electrical resistance of said rheostat, said case having a wall formed on an outer surface thereof, an activator rotatably connected to said case and disposed to rotate over said wall, said activator being connected to a cam, means to retain said activator in a selected position when said activator is rotated in a first direction, means to return said activator to an original position when said activator is rotated in an opposite second direction, wherein, when said activator is rotated, said cam moves said plunger attached to said rheostat and controls the voltage applied to said lamp affecting the intensity of light emitted by said lamp, such that the activator may be rotated in said first direction to said selected position to provide a selected intensity of light and may be rotated in said second direction to momentarily provide said selected intensity of light.

* * * * *

UNITED STATES PATENT AND TRADEMARK OFFICE
CERTIFICATE OF CORRECTION

PATENT NO. : 6,024,471

DATED : February 15, 2000

INVENTOR(S) : McDermott

It is certified that error appears in the above-identified patent and that said Letters Patent is hereby corrected as shown below:

Column 1, line 31, change "embodiment" to read --embodiments--.

Column 2, line 6, delete "contoured".

Column 3, line 6, add --ring-- between "U" and "shaped".

Column 3, line 48, change "Including" to read --including--.

Column 4, line 21, delete "100".

Column 4, line 22, change "inven tion" to read --invention--.

Column 4, lines 37 and 44, change "Is" to read --is--.

Column 7, line 17, change "Infinite" to read --infinite--.

Column 7, line 31, change "Is" to read --is--.

Column 8, line 16, change "In" to read --in--.

Column 10, line 64, change "Is" to read --is--.

Column 10, lines 67, change "OFF," to read --"off--.

Column 11, line 5, delete "in this position".

Column 11, line 6, change "return – " to read --return to this position--.

UNITED STATES PATENT AND TRADEMARK OFFICE
CERTIFICATE OF CORRECTION

PATENT NO. : 6,024,471

DATED : February 15, 2000

INVENTOR(S) : McDermott

It is certified that error appears in the above-identified patent and that said Letters Patent is hereby corrected as shown below:

Column 11, line 22, change "ad" to read --and--.

Column 11, line 57, delete "about".

Column 11, line 66, change "Internal" to read --internal--.

Column 12, lines 22, 27, and 30, add --ring-- between "u" and "seal".

Column 12, line 44, change "533" to read --53B--.

Signed and Sealed this

Twenty-seventh Day of March, 2001

*Attest:*

NICHOLAS P. GODICI

*Attesting Officer*    *Acting Director of the United States Patent and Trademark Office*